US010703499B2

(12) United States Patent
Hall

(10) Patent No.: US 10,703,499 B2
(45) Date of Patent: Jul. 7, 2020

(54) IN-FLIGHT AIRCRAFT REFUELING BY JETTISONING AND ONBOARDING REPLACEABLE FUEL TANKS

(71) Applicant: AAI Corporation, Hunt Valley, MD (US)

(72) Inventor: Brandon Reid Hall, Stewartstown, PA (US)

(73) Assignee: Textron Systems Corporation, Hunt Valley, MD (US)

( * ) Notice: Subject to any disclaimer, the term of this patent is extended or adjusted under 35 U.S.C. 154(b) by 239 days.

(21) Appl. No.: 15/984,736

(22) Filed: May 21, 2018

(65) Prior Publication Data

US 2019/0352015 A1 Nov. 21, 2019

(51) Int. Cl.
*B64D 37/12* (2006.01)
*B64D 1/22* (2006.01)
*B64C 39/02* (2006.01)

(52) U.S. Cl.
CPC ............ *B64D 37/12* (2013.01); *B64C 39/024* (2013.01); *B64D 1/22* (2013.01); *B64C 2201/063* (2013.01); *B64C 2201/145* (2013.01)

(58) Field of Classification Search
CPC ...... B64C 2201/063; B64D 37/12; B64D 1/00
See application file for complete search history.

(56) References Cited

U.S. PATENT DOCUMENTS

| 1,458,710 | A | * | 6/1923 | Kolczewski | ............. | B64D 1/22 |
| | | | | | | 258/1.2 |
| 2,823,881 | A | | 2/1958 | Patterson | | |
| 2,879,016 | A | | 3/1959 | Haase | | |
| 2,946,605 | A | | 7/1960 | Mosher | | |
| 3,100,614 | A | | 8/1963 | Morrow | | |
| 4,426,050 | A | | 1/1984 | Long | | |
| 6,142,421 | A | * | 11/2000 | Palmer | .................. | B64C 39/024 |
| | | | | | | 220/4.13 |
| 6,260,797 | B1 | * | 7/2001 | Palmer | .................. | B64C 39/024 |
| | | | | | | 102/501 |
| 7,702,460 | B2 | | 4/2010 | Liu et al. | | |
| 10,017,265 | B1 | * | 7/2018 | Larsen | .................. | B64D 27/24 |
| 10,029,803 | B1 | * | 7/2018 | Larsen | .................. | B64D 39/00 |

(Continued)

FOREIGN PATENT DOCUMENTS

| EP | 17484332 B1 | 5/2007 |
| EP | 1868008 B1 | 12/2007 |

(Continued)

*Primary Examiner* — Philip J Bonzell
*Assistant Examiner* — Tye William Abell
(74) *Attorney, Agent, or Firm* — BainwoodHuang

(57) ABSTRACT

A method of operating an aircraft includes, prior to an in-flight refueling operation, operating the aircraft using fuel from a first fuel tank connected to a fuel delivery system. Subsequently, the in-flight refueling operation is performed over a refueling area while operating the aircraft from another fuel tank, including (1) disconnecting the first fuel tank from the fuel delivery system, (2) jettisoning the first fuel tank, and (3) taking on a replacement fuel tank by (a) capturing the replacement fuel tank from the refueling area and (b) bringing the captured replacement fuel tank onboard the aircraft. The replacement fuel tank is then connected to the fuel delivery system and the aircraft is operated using fuel from the replacement fuel tank.

20 Claims, 5 Drawing Sheets

(56) References Cited

U.S. PATENT DOCUMENTS

| | | | |
|---|---|---|---|
| 10,112,712 B1 * | 10/2018 | Gentry | B64C 39/024 |
| 2006/0202088 A1 * | 9/2006 | Padan | B64D 1/00 244/137.1 |
| 2009/0292406 A1 | 11/2009 | Aparicio et al. | |

FOREIGN PATENT DOCUMENTS

| EP | 1755951 B1 | 3/2009 |
|---|---|---|
| EP | 2800695 B1 | 11/2018 |
| WO | 2013102906 | 7/2013 |

* cited by examiner

IN-FLIGHT AIRCRAFT REFUELING BY JETTISONING AND ONBOARDING REPLACEABLE FUEL TANKS

BACKGROUND

The invention relates to the field of aircraft refueling.

SUMMARY

Conventional aircraft employ fixed onboard fuel tanks that hold fuel for delivery to the aircraft engines during flight operation. Conventional refueling involves pumping fuel into these onboard tanks, and is typically done on the ground when the aircraft is stationary. Some aircraft, notably military aircraft, can be refueled during flight by accepting fuel delivered from a separate tanker-style aircraft flying alongside. Airborne refueling is a very specialized, costly, and hazardous operation and not typically utilized outside of combat or other special circumstances. Ground refueling requires a stop, which results in additional aircraft downtime. It would be beneficial to have a refueling scheme that reduces such downtime without introducing the specialized and hazardous operations of airborne refueling.

Generally, the disclosure relates to an aircraft refueling technique in which an aircraft utilizes modular, replaceable fuel tanks that are exchanged during flight. An aircraft refuels by jettisoning an empty fuel tank and picking up a full one. This is done in-flight so that downtime is minimized. To support flight operations, refueling areas are set up across desired flight paths. Generally, a given aircraft can be operated continuously over a long flight path while carrying reduced fuel load. On a round trip mission, the required fuel onboard can be reduced by 66% with only one fueling station and 80% with two fueling stations. Reducing fuel load translates to reductions in size, weight, and cost of the aircraft required for a given mission.

More particularly, a method is disclosed of operating an aircraft that includes, prior to an in-flight refueling operation, operating the aircraft using fuel from a first fuel tank connected to a fuel delivery system. Subsequently, the in-flight refueling operation is performed over a refueling area while operating the aircraft from another fuel tank, including (1) disconnecting the first fuel tank from the fuel delivery system, (2) jettisoning the first fuel tank, and (3) taking on a replacement fuel tank by (a) capturing the replacement fuel tank from the refueling area and (b) bringing the captured replacement fuel tank onboard the aircraft. The replacement fuel tank is then connected to the fuel delivery system and the aircraft is operated using fuel from the replacement fuel tank. The refueling area may be either land-based or water-based (e.g., a sea location). The disclosed technique employs automation and is thus particularly suited for use in unmanned (remotely piloted) aircraft.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
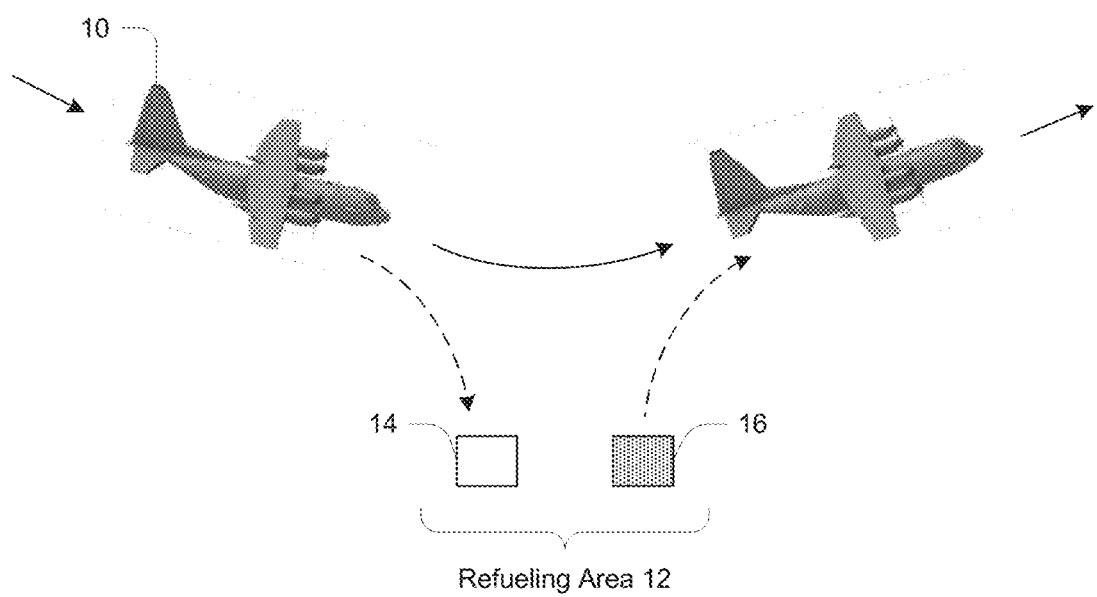
FIG. 1 is a schematic diagram of an in-flight aircraft refueling operation.

FIG. 1 illustrates in schematic fashion a method of in-flight refueling an aircraft 10. Initially, the aircraft 10 operates using fuel from an onboard replaceable fuel tank. As the aircraft 10 approaches a refueling area 12, it performs the in-flight refueling operation while fuel is provided to the aircraft from another onboard fuel tank. The refueling operation includes disconnecting the replaceable tank from the aircraft fuel delivery system and jettisoning the replaceable tank, shown as empty tank 14, and then taking on a replacement fuel tank 16 by capturing the replacement fuel tank from the refueling area 12 and bringing the captured replacement fuel tank 16 onboard the aircraft 10. Subsequently, the replacement fuel tank 16 is connected to the aircraft fuel delivery system and the aircraft is operated using fuel from the replacement fuel tank 16. As noted above, the aircraft 10 may be an unmanned aircraft, although the general approach herein may be used with manned aircraft also. Also FIG. 1 shows the aircraft 10 as being a fixed-wing aircraft, for which the disclosed technique may be particularly well suited. However, the disclosed technique may also be used with other aircraft including rotary-wing aircraft such as helicopters, with appropriate modification of specific details as will be apparent to those skilled in the art.

Figure 2:
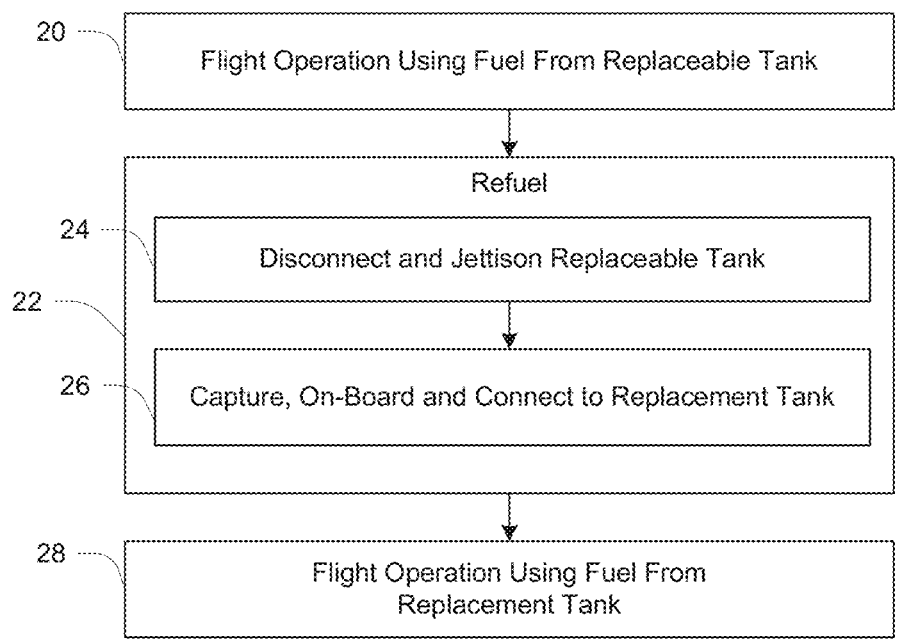
FIG. 2 is a flow diagram of an in-flight aircraft refueling operation.

FIG. 2 shows the method in the form of a flow diagram. At 20, the aircraft 10 operates using fuel from the replaceable tank 14. At 22 is the refueling operation having substeps 24 and 26. At 24, the aircraft 10 disconnects and jettisons the replaceable tank 14, and at 26, the aircraft 10 captures, onboards and connects to the replacement tank 16. At 28, the aircraft engages in subsequent flight operation using fuel from the replacement tank 16.

For the above operation, a high accuracy positioning system is used to position the aircraft 10 relative to the replacement tank 16, whether on land or water. Preferably, the aircraft 10 employs a high precision positioning system, for example real-time kinematic (RTK) positioning GPS which can provide centimeter-level accuracy. RTK GPS is already in use on unmanned aircraft 10, such as the Aerosonde® UAV. Autopilot automation includes use of full flaps to slow the aircraft 10 prior to engagement, followed by high thrust once the tank 16 is engaged, and steep aircraft climb after engagement to ensure that the tank 16 does not strike the ground or water. If a stock aircraft 10 is used, structural modifications may be required to accept the large hanging load of a full fuel tank 16. Depending on the aircraft design, a movable center of gravity may be required.

For accurate positioning, the tank 16 may include a GPS location beacon, which includes a GPS receiver and transmitter and enables a replacement tank 16 to announce its position to the aircraft 10 for precision engagement. For the jettisoning operation, a droppable tank must be used. If the refueling area 12 is a water location, then floating tanks will typically be required, if there is no separate floating support on which non-floating tanks can be dropped or from which they can be deployed. A replacement tank 16 includes structure that is engaged by a hook of the aircraft 10 to capture the tank 16 during a low-altitude fly-by, such as a stiff cable or other strong member extending upwardly from the tank 16 when in position for retrieval and onboarding.

During the refueling operation, two distinct tanks 14 and 16 are involved as described above, the tank 14 being empty and the tank 16 being full. The labels "empty" and "replacement" describe the respective states of the two tanks at the time of refueling. It will be appreciated that a given tank can also be described by both labels at different times. A tank first serves as a replacement tank 16, full of fuel for use by the aircraft 10, and later becomes an empty tank 14 requiring replacement. In the description below there is reference to a tank in use, which is essentially in a third state and thus given a distinct reference number 30. It will be understood that a given tank progresses from being a replacement tank 16, to an in-use tank 30, to an empty tank 14.

Generally, the aircraft 10 includes a fuel delivery system having a modular connector for connecting to replaceable fuel tanks, and a selector for selectively accepting fuel from a replaceable fuel tank and from another fuel tank, as well as subsystems used for the in-flight refueling operation. These include (1) a connect/disconnect subsystem for automatically disconnecting a first replaceable fuel tank from the fuel delivery system and for automatically connecting a second replaceable fuel tank to the fuel delivery system, (2) a tank handling subsystem for automatically jettisoning the first replaceable fuel tank and for automatically positioning the second replaceable fuel tank for connection to the fuel delivery system and operational use, and (3) a retrieval subsystem for taking on the second replaceable fuel tank as a replacement fuel tank by (a) capturing the second replaceable fuel tank from the refueling area and (b) bringing the captured second replaceable fuel tank onboard the aircraft. Examples of these subsystems and their use are provided below.

Figure 3:
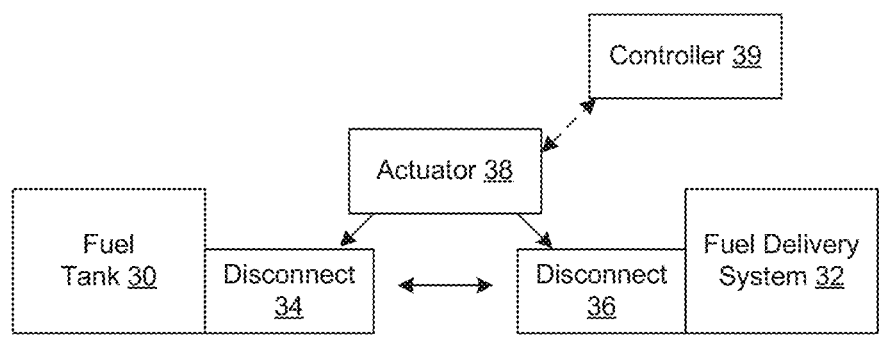
FIG. 3 is a schematic diagram of connection of a replaceable fuel tank to an aircraft fuel delivery system.

FIG. 3 illustrates an example connect/disconnect subsystem providing for connection of an in-use fuel tank 30 within the aircraft 10. The fuel tank 30 is connected to the aircraft fuel delivery system 32 by a fuel line having quick-disconnect fittings 34, 36, also referred to herein as "quick-disconnects". An actuator 38 is used to manipulate the quick-disconnects 34, 36 to disconnect the fuel line between the tank 30 and the fuel delivery system 32 when the tank 30 is an empty tank 14 to be replaced, as well as automatically connect the fuel line between the tank 30 and the fuel delivery system 32 when the tank is a replacement tank 16 to be used in subsequent flight.

Also shown in FIG. 3 is an onboard controller 39 which provides for automated operation of the actuator 38. The controller 39 is a processor-based device programmed to operate the actuator 38 as well as other components according to the refueling operation as described herein. The controller 39 may also have communications links to off-board devices or systems, such as a ground controller for example. As described below, the replacement tank 16 may include a GPS beacon for transmitting its location to enable the aircraft 10 to precisely locate the replacement tank 16 during the capture operation. In such a case the controller 39 will obtain the tank location information either directly or indirectly via another on-board system.

Figure 4:
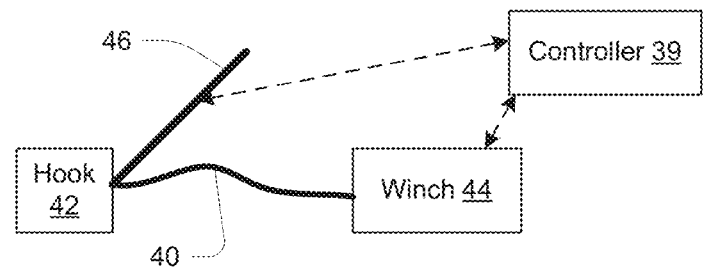
FIG. 4 is a schematic diagram of structure for capturing and onboarding a replacement fuel tank.

FIG. 4 shows structure within the aircraft 10 relating to capture and onboarding of a replacement fuel tank 16, serving as an example retrieval subsystem. In one embodiment, the tank 16 is captured in a manner analogous to the capture of a tow banner by small aircraft commonly referred to as "banner planes". A strong tow line 40 has a hook 42 at one end and is securely connected to the aircraft 10 at the other. For bringing the tank 16 onboard, a mechanism such as a winch 44 is used, such as those used in helicopters for rescues for example. Overall, the setup preferably utilizes an adjustable tension mechanism to minimize aircraft shock loads. The hook 42 and line 40 may be deployed using an extendible boom 46. The winch 44 and boom 46 are coupled to the controller 39 for automated operation. In operation, the hook 42 engages a feature on the replacement tank 16 to capture it as the aircraft 10 flies by at just above ground level. After the replacement tank 16 is captured, the winch 44 is used to onboard the replacement tank 16 by reeling it in. As described more below, a tank moving system is used to position an onboarded tank for connection to the aircraft fuel delivery system 32.

Figure 5:
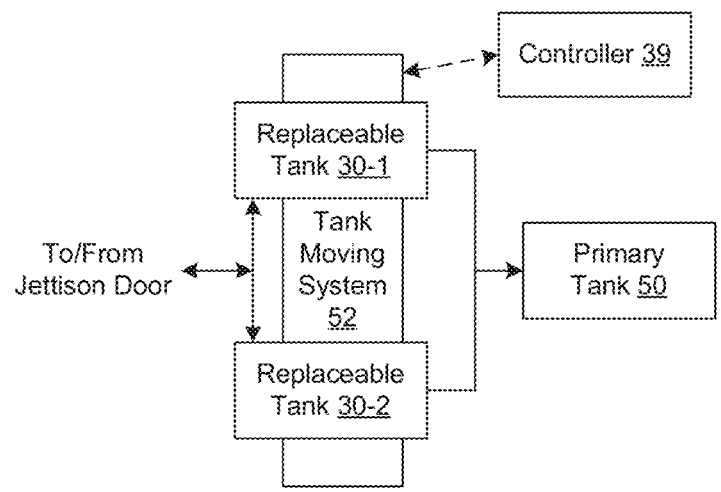
FIG. 5 is a schematic diagram illustrating use of a tank moving system.

FIG. 5 illustrates additional structure relating to movement and positioning of the fuel tank 30 within the aircraft 10, serving as an example of the tank handling subsystem. In the illustrated arrangement, two replaceable tanks 30-1 and 30-2 are utilized, and each feeds fuel to a primary tank 50 that provide fuel to the aircraft engine(s) (not shown). A tank moving system 52 straddles the positions of the tanks 30 and is responsible for moving them between their respective operational positions (illustrated) and a path to/from a jettison door (not shown) through which an empty tank 14 is jettisoned and a replacement tank 16 is onboarded. The tank moving system 52 may include an overhead crane or actuated rollers, for example. It is also coupled to the controller 39 for automated operation.

Figure 6:
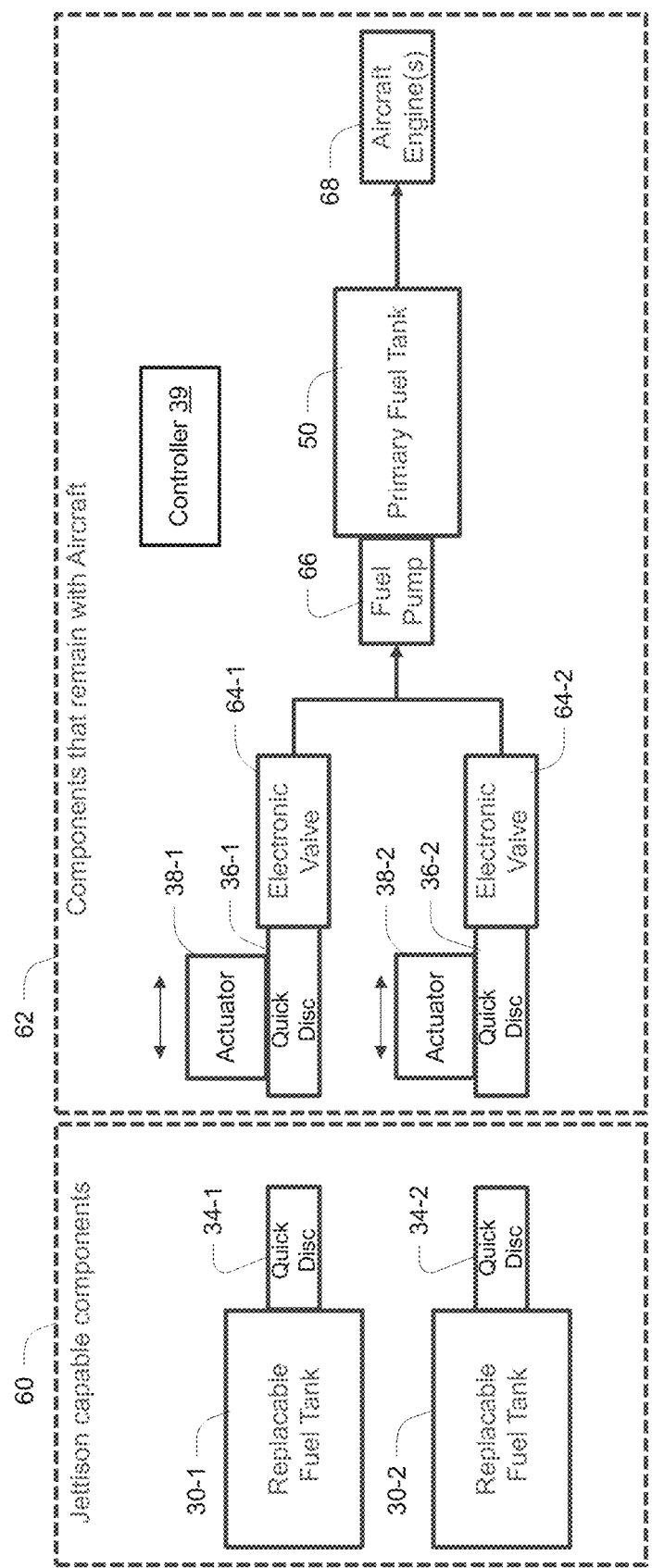
FIG. 6 is a detailed block diagram of an aircraft fuel system employing replaceable fuel tanks.

FIG. 6 is a more detailed view of the aircraft fuel system, divided into first components 60 that are jettison-capable and second components 62 that remain with the aircraft 10. In addition to the components discussed above with reference to FIG. 3, the on-aircraft components 62 include electronic valves 64-1, 64-2 and a fuel pump 66 between the respective replaceable tanks 30-1, 30-2 and the primary fuel tank 50. Also illustrated is the aircraft engine(s) 68 which receive the fuel for operation.

Figures 7, 8:
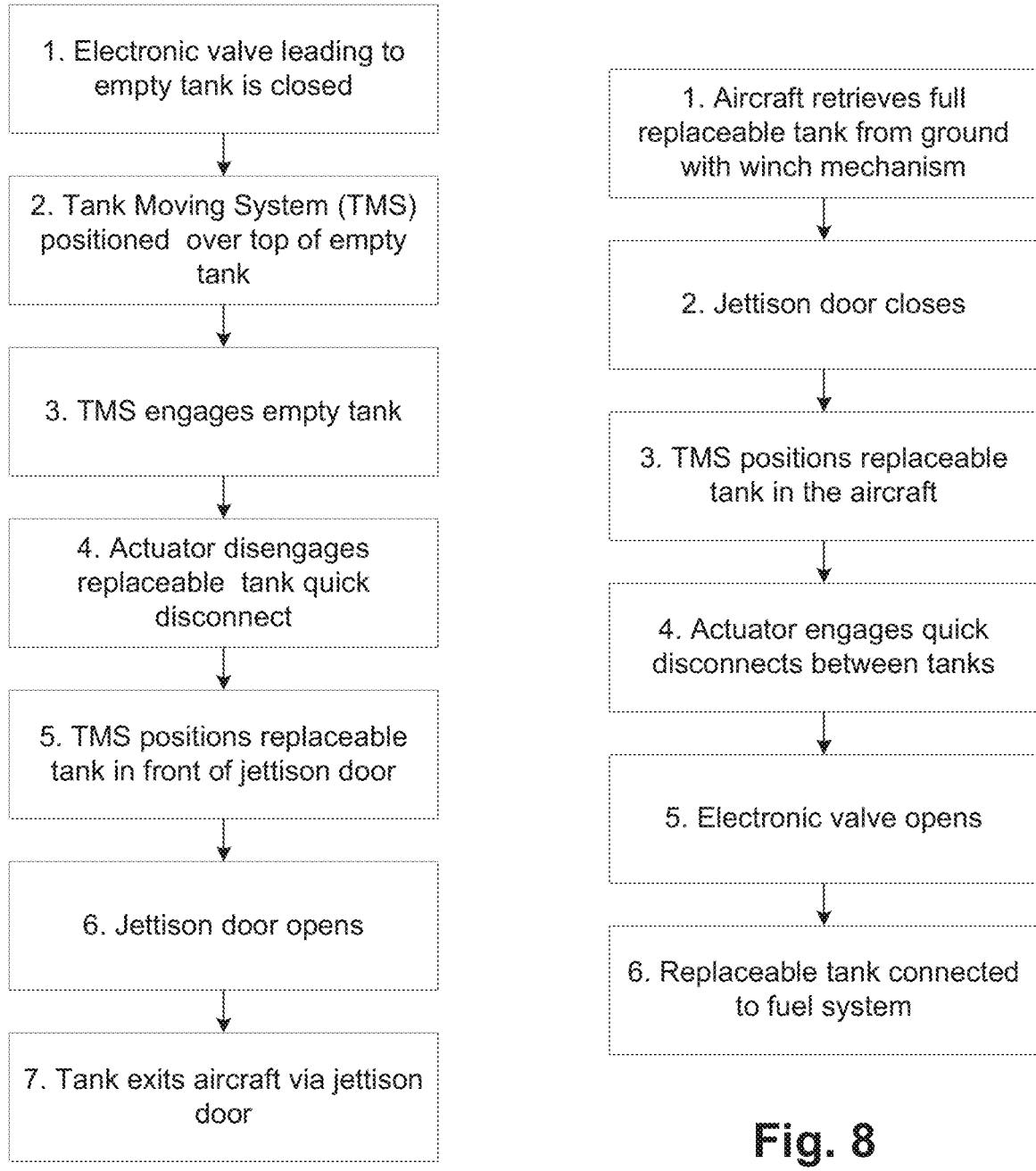
FIG. 7 is a detailed flow diagram for a fuel tank jettisoning process.
FIG. 8 is a detailed flow diagram for a fuel tank onboarding process.

FIGS. 7 and 8 provide additional detail of example jettisoning and onboarding processes respectively.

In FIG. 7, jettisoning an empty tank 14 is performed as follows:

1. System closes electronic valve 64 to an in-use tank 30 that has become empty (becomes empty tank 14)
2. Tank moving system (TMS) is positioned above empty tank 14
3. TMS engages empty tank 14
4. Actuator 38 disengages the quick-disconnect 36 of the empty tank 14
5. TMS positions empty tank 14 in front of jettison door, which is still closed
6. Jettison door opens
7. A release mechanism holding the tank 14 is opened, and the tank 14 exits the aircraft 10 via the jettison door. The tank 14 may drop out of the bottom of the aircraft 10, or it may slide down rollers and out of the aircraft 10.

In FIG. 8, onboarding a replacement tank 16 is performed as follows. It is assumed that the jettison door is already open, which in operation may be common as onboarding may typically occur immediately after a jettison operation.

1. Aircraft 10 retrieves replacement tank 16 after capture, using the winch 44. The replacement tank 16 enters via the open jettison door
2. Jettison door closes 3. TMS positions the replacement tank 16 in its operational position in the aircraft 10

4. Actuator 38 engages the quick-disconnect 36 of in-position replacement tank 16, establishing connection of the fuel line to fuel system 5. System opens the electronic valve 64 to the in-position replacement tank 16 (becomes in-use tank 30)

6. Tank 30 now functionally connected for fuel delivery

While various embodiments of the invention have been particularly shown and described, it will be understood by those skilled in the art that various changes in form and details may be made therein without departing from the spirit and scope of the invention as defined by the appended claims.

What is claimed is:

1. A method of operating an aircraft, comprising:
   prior to an in-flight refueling operation, operating the aircraft using fuel from a first fuel tank connected to a fuel delivery system;
   performing the in-flight refueling operation over a refueling area while operating the aircraft from another fuel tank, including (1) disconnecting the first fuel tank from the fuel delivery system, (2) jettisoning the first fuel tank from the aircraft, and (3) taking on a replacement fuel tank by (a) capturing the replacement fuel tank from the refueling area and (b) bringing the captured replacement fuel tank onboard the aircraft; and
   subsequently connecting the replacement fuel tank to the fuel delivery system and operating the aircraft using fuel from the replacement fuel tank.

2. The method of claim 1, further including, as part of the in-flight refueling operation, (1) autopilot automation including use of full flaps to slow the aircraft prior to engaging the replacement fuel tank, followed by (2) high thrust once the replacement fuel tank is engaged, and steep aircraft climb after engagement to ensure that the replacement fuel tank does not strike ground or water of the refueling area.

3. The method of claim 1, wherein capturing the replacement fuel tank includes using a hook and tow line of the aircraft to engage a structure of the replacement fuel tank.

4. The method of claim 1, wherein the first fuel tank and the replacement fuel tank connect to the fuel delivery system using quick-disconnect fittings, and wherein (1) disconnecting the first fuel tank includes using an automated actuator of the aircraft to disengage a quick-disconnect fitting of the first fuel tank, and (2) connecting the replacement fuel tank includes using the automated actuator to engage a quick-disconnect fitting of the replacement fuel tank.

5. The method of claim 1, wherein jettisoning the first fuel tank includes:
   first closing an electronic valve in a fuel line between the first fuel tank and the fuel delivery system of the aircraft;
   positioning a tank moving system to engage the first fuel tank, disengaging a quick-disconnect fitting in the fuel line to disconnect the first fuel tank from the fuel delivery system, and using the tank moving system to position the first fuel tank adjacent a jettison doorway; and
   releasing the first fuel tank through the jettison doorway to exit the aircraft.

6. The method of claim 1, wherein onboarding the replacement fuel tank includes:
   reeling the captured replacement fuel tank onto the aircraft through a jettison doorway;
   using an onboard tank moving system, positioning the replacement fuel tank in an operational position;
   engaging a quick-disconnect fitting in a fuel line to connect the replacement fuel tank to the fuel delivery system of the aircraft; and
   opening an electronic valve in the fuel line to enable the aircraft to operate using fuel from the replacement fuel tank.

7. The method of claim 1, wherein the aircraft is an unmanned aircraft having automated components for performing the in-flight refueling operation of the aircraft, and wherein each of the steps is performed by employing one or more respective automated components.

8. The method of claim 7, wherein the automated components include (1) an automated actuator used to disconnect the first fuel tank and connect the replacement fuel tank from/to the fuel delivery system of the aircraft, (2) an automated tank moving system to jettison the first fuel tank and position the captured replacement fuel tank in an operation position for connection to the fuel delivery system, and (3) an automated retrieval subsystem to capture the replacement fuel tank and bring it onboard the aircraft.

9. The method of claim 1, wherein the aircraft includes (1) a tow line with a hook at one end configured to engage a corresponding member of the replacement fuel tank, and (2) a winch for reeling in the tow line, and wherein:
   capturing the replacement fuel tank includes bringing the hook into contact with the member as the aircraft flies past the replacement fuel tank and initiating a climb of the aircraft to lift the replacement fuel tank into the air; and
   bringing the captured replacement fuel tank onto the aircraft includes using the winch to reel in the captured replacement fuel tank.

10. The method of claim 9, wherein bringing the hook into contact with the member includes deploying the hook and tow line from the aircraft using an extendible boom.

11. The method of claim 1, wherein the in-flight refueling operation includes using a high-accuracy positioning system to position the aircraft relative to the replacement tank for capturing.

12. The method of claim 11, wherein high accuracy positioning system includes real-time kinematic positioning GPS.

13. The method of claim 11, wherein the replacement fuel tank includes a GPS location beacon used by the replacement fuel tank to announce its position to the aircraft for precision engagement.

14. An aircraft, comprising:
   a fuel delivery system having a modular connector for connecting to replaceable fuel tanks, and a selector for selectively accepting fuel from a replaceable fuel tank and from another fuel tank;
   respective automated subsystems used for an automated in-flight refueling operation, including (1) a connect/disconnect subsystem for disconnecting a first replaceable fuel tank from the fuel delivery system and for connecting a second replaceable fuel tank to the fuel delivery system, (2) a tank handling subsystem for jettisoning the first replaceable fuel tank and for automatically positioning the second replaceable fuel tank for connection to the fuel delivery system and operational use, and (3) a retrieval subsystem for taking on the second replaceable fuel tank as a replacement fuel tank by (a) capturing the second replaceable fuel tank from a refueling area and (b) bringing the captured second replaceable fuel tank onboard the aircraft.

15. The aircraft of claim 14, wherein the connect/disconnect subsystem includes an automated actuator used to disconnect the first fuel tank and connect the replacement fuel tank from/to the fuel delivery system of the aircraft.

16. The aircraft of claim 14, further including a high accuracy positioning system to position the aircraft relative to the second replaceable tank for capturing.

17. The aircraft of claim 14, wherein the connect/disconnect subsystem includes quick-disconnect fittings by which the first replaceable fuel tank and the second replaceable fuel tank connect to the fuel delivery system, and an automated actuator operatively coupled to the quick-disconnect fittings for disconnecting a fuel line between the first replaceable fuel tank and the fuel delivery system and for connecting a fuel line between the second replaceable fuel tank and the fuel delivery system.

18. The aircraft of claim 14, wherein the retrieval subsystem includes (1) a tow line with a hook at one end configured to engage a corresponding member of the second replaceable fuel tank in a capturing operation, and (2) a winch for reeling in the tow line with captured second replaceable fuel tank to bring the second replaceable fuel tank onto the aircraft.

19. The aircraft of claim 14, wherein the tank handling subsystem is configured and operative to move the replaceable tanks between respective operational positions and a path to/from a jettison door of the aircraft through which an empty tank is jettisoned and a replacement tank is onboarded.

20. The aircraft of claim 19, wherein the tank handling subsystem includes an overhead crane or actuated rollers.

\* \* \* \* \*